US010454089B2

(12) United States Patent
Oda et al.

(10) Patent No.: US 10,454,089 B2
(45) Date of Patent: Oct. 22, 2019

(54) CLAD MATERIAL FOR BATTERY NEGATIVE ELECTRODE LEAD MATERIAL, METHOD OF MANUFACTURING CLAD MATERIAL FOR BATTERY NEGATIVE ELECTRODE LEAD MATERIAL AND BATTERY

(71) Applicants: NEOMAX MATERIALS Co., Ltd., Suita-shi, Osaka (JP); HITACHI METALS, LTD., Tokyo (JP)

(72) Inventors: Yoshimitsu Oda, Suita (JP); Keita Watanabe, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 189 days.

(21) Appl. No.: 15/097,385

(22) Filed: Apr. 13, 2016

(65) Prior Publication Data
US 2016/0308198 A1 Oct. 20, 2016

(30) Foreign Application Priority Data

Apr. 15, 2015 (JP) .................................. 2015-083021

(51) Int. Cl.
| | |
|---|---|
| B32B 15/01 | (2006.01) |
| H01M 2/26 | (2006.01) |
| C22C 9/00 | (2006.01) |
| C22C 19/03 | (2006.01) |

(52) U.S. Cl.
CPC ............... *H01M 2/26* (2013.01); *B32B 15/01* (2013.01); *C22C 9/00* (2013.01); *C22C 19/03* (2013.01)

(58) Field of Classification Search
None
See application file for complete search history.

(56) References Cited

U.S. PATENT DOCUMENTS

| | | |
|---|---|---|
| 9,017,871 B2 | 4/2015 | Oda et al. |
| 9,093,704 B2 | 7/2015 | Yokoyama et al. |
| 9,266,188 B2 | 2/2016 | Oda et al. |

(Continued)

FOREIGN PATENT DOCUMENTS

| | | |
|---|---|---|
| JP | 10-154490 A | 6/1998 |
| JP | H11-297300 A | 10/1999 |

(Continued)

OTHER PUBLICATIONS

Schwarz, S.M., et al, "Effects of Diffusion Induced Recrystallization on Volume Diffusion in the Copper-Nickel System," Acta Materialia 51 (2003) 2765-2776 (Year: 2003).*

(Continued)

*Primary Examiner* — Daniel J. Schleis
(74) *Attorney, Agent, or Firm* — Westerman, Hattori, Daniels & Adrian, LLP

(57) ABSTRACT

This clad material for a battery negative electrode lead material is constituted of a clad material of a three-layer structure including a first layer constituted of pure Ni, a second layer constituted of pure Cu and a third layer constituted of pure Ni. The thickness of a first diffusion layer formed between the first layer and the second layer and the thickness of a second diffusion layer formed between the second layer and the third layer are at least 0.5 μm and not more than 3.5 μm.

17 Claims, 3 Drawing Sheets

(56) References Cited

U.S. PATENT DOCUMENTS

| | | | |
|---|---|---|---|
| 9,890,438 B2 | 2/2018 | Oda et al. | |
| 2010/0330427 A1 | 12/2010 | Kogetsu et al. | |
| 2013/0209874 A1* | 8/2013 | Yoshida | B23K 11/002 |
| | | | 429/211 |

FOREIGN PATENT DOCUMENTS

| | | | |
|---|---|---|---|
| JP | 2001-176491 A | | 6/2001 |
| JP | 2003-203622 A | | 7/2003 |
| JP | 2004-039651 A | | 2/2004 |
| JP | 2004-259547 A | | 9/2004 |
| JP | 2004-285371 A | | 10/2004 |
| JP | 2005-085479 A | | 3/2005 |
| JP | 2006139987 | * | 6/2006 |
| JP | 2009-152182 A | | 7/2009 |
| JP | 2010-257695 A | | 11/2010 |
| JP | 2013-016328 A | | 1/2013 |
| KR | 10-2012-0140258 A | | 12/2012 |
| KR | 10-2013-0039319 A | | 4/2013 |
| KR | 10-2013-0045950 A | | 5/2013 |
| WO | 2010/041399 A1 | | 4/2010 |

OTHER PUBLICATIONS

Callister, Jr. William D., et al. "Materials Science and Engineering: An Introduction" 8th Ed., vol. 3, pp. 122-137, 2010 (Year: 2010).*
Office Action dated Apr. 28, 2018, issued in counterpart Chinese application No. 201610235024.4, with English machine. (18 pages).
Office Action dated May 18, 2018, issued in counterpart Korean Application No. 10-2016-0039370, with English machine translation. (19 pages).
Office Action dated Nov. 2, 2018, issued in counterpart Chinese Application No. 201610235024.4, with English achine translation. (30 pages).
Office Action dated Nov. 28, 2018, issued in counterpart Korean Application No. 10-2016-0039370, with English machine translation. (17 pages).
Japanese Office Action dated Mar. 12, 2019, issued in counterpart application No. 2015-083021 with an English Translation (8 pages).
Office Action dated Apr. 24, 2019, issued in counterpart CN application No. 201610235024.4, with English translation. (22 pages).
A123 Systems, LLC "Cylindrical Battery Pack Design, Validation, and Assembly Guide" pp. 1-66, 2013.†
Engineered Materials Solutions "Clad It—Clad Metal: What it is. How it's made. What it can do for you." found at www.cladit.com, 2007.†
ThyssenKrupp Materials, NA, "Copper & Alloys—the Electric Metal" Copper and Brass Sales Division, p. 6, 2014.†
Special Metals, "Nickel", found at www.specialmetals.com, SMC-061, pp. 1-20, 2006.†
Hall, A.M.,et al. "Thermal and Mechanical Treatments for Nickel . . . " Columbus Laboratories, Battelle Memorial Inst., NASA, pp. 4-7, 1972.†
Metals Handbook, 9th Ed., vol. 3, "Properties and Selection: Stainless Steels, Tool Materials . . . " Amer Soc for Metals, pp. 128-131, 1980.†
Schwartz,S.M.,et al. "Effects of diffusions induced recrystallization . . . " Acta Materialia 51, pp. 2765-2776, 2003.†
Callister, Jr. William D., et al. "Materials Science and Engineering An Introduction" 8th Ed., vol. 3, pp. 122-137, 2010.†
Hitachi Metals, Ltd. "Clad Metals—Pursuing the Unlimited Potential of Metals" pp. 1-18; 2014.†
Kim, K.H., et al. "Bonding Quality of Cooper-Nickel Fine Clad Meter Prepared by Surface Activated Bonding" Materials Transactions, vol. 51, No. 4, pp. 787-792, 2010.†
Li, H, et al., "Effects of annealing process on microstructure and electrical properties of cold-drawn thing layer copper cladding steel sire", J Mater Sci: Mater Electron, 25:5107-5113, 2014.†

* cited by examiner
† cited by third party

CLAD MATERIAL FOR BATTERY NEGATIVE ELECTRODE LEAD MATERIAL, METHOD OF MANUFACTURING CLAD MATERIAL FOR BATTERY NEGATIVE ELECTRODE LEAD MATERIAL AND BATTERY

CROSS-REFERENCE TO RELATED APPLICATIONS

The priority application number JP2015-083021, Clad Material for Battery Negative Electrode Lead Material and Method of Manufacturing Clad Material for Battery Negative Electrode Lead Material, Apr. 15, 2015, Yoshimitsu Oda et al., upon which this patent application is based, is hereby incorporated by reference.

BACKGROUND OF THE INVENTION

1. Field of the Invention

The present invention relates to a clad material for a battery negative electrode lead material, a method of manufacturing a clad material for a battery negative electrode lead material and a battery including the clad material for a battery negative electrode lead material.

2. Description of the Background Art

In general, there is known a technique of employing Ni (nickel) having high corrosion resistance as a battery negative electrode lead material for connecting a negative electrode collector and a battery negative electrode with each other. However, Ni has high electrical resistance, and hence power loss is disadvantageously increased following higher output or downsizing of a battery. On that account, there is known a technique of employing Cu (copper) having low electrical resistance as the core of a battery negative electrode lead material, in order to improve electrical conductivity.

For example, Japanese Patent Laying-Open No. 2003-203622 discloses an in-battery lead material connecting a negative electrode and a container of stainless constituting a negative electrode terminal with each other. This in-battery lead material consists of a clad material of a three-layer structure prepared by integrally bonding a core (may hereinafter be referred to as a "Cu layer") constituted of pure Cu or a Cu alloy mainly composed of Cu and a pair of connecting materials (may hereinafter be referred to as "Ni layers") constituted of pure Ni or an Ni alloy mainly composed of Ni and arranged on both sides of the core to each other.

Japanese Patent Laying-Open No. 2003-203622 discloses that the clad material of the three-layer structure prepared by bonding the Ni layer, the Cu layer and the Ni layer to each other for the in-battery lead material is heat-treated under a condition of holding the same in the temperature range of 500° C. to 600° C. for one hour. If batch heat treatment is performed on the clad material under a condition of holding the same at a temperature of 600° C. for one hour, for example, dispersions in thicknesses of diffusion layers formed on bonded regions between the Cu layer and the Ni layers are easily increased. When such diffusion layers remarkably dispersed in thicknesses are formed, the thickness of the Cu layer may be partially reduced, to result in high electrical loss in the in-battery lead material. If the batch heat treatment is performed on the clad material under a condition of holding the same at a temperature of 500° C. for one hour, for example, welding strength between the in-battery lead material and the container (the negative electrode terminal) may be hard to ensure when the former is resistance-welded to the latter.

SUMMARY OF THE INVENTION

The present invention has been proposed in order to solve the aforementioned problems, and an object thereof is to provide a clad material for a battery negative electrode lead material capable of inhibiting the battery negative electrode lead material from increase in electrical loss while ensuring welding strength between the battery negative electrode lead material and a battery negative electrode, a method of manufacturing the clad material for a battery negative electrode lead material and a battery including the clad material for a battery negative electrode lead material.

As a result of conducting a deep study while particularly noting the diffusion layers in the conventional clad material described above, the inventor has found the following structure capable of attaining the aforementioned object: A clad material for a battery negative electrode lead material according to a first aspect of the present invention is constituted of a clad material of a three-layer structure prepared by stacking a first layer constituted of pure Ni containing at least 99.0 mass % of Ni, a second layer constituted of pure Cu containing at least 99.75 mass % of Cu and a third layer constituted of pure Ni containing at least 99.0 mass % of Ni in this order, while the thickness of a first diffusion layer formed between the first layer and the second layer and the thickness of a second diffusion layer formed between the second layer and the third layer are at least 0.5 μm and not more than 3.5 μm. The "thickness of the first (second) diffusion layer" indicates the average of thicknesses of the first (second) diffusion layer measured on a plurality of different points (a plurality of regions) in the longitudinal direction of the clad material.

In the clad material for a battery negative electrode lead material according to the first aspect of the present invention, as hereinabove described, the thickness of the first diffusion layer formed between the first layer and the second layer and the thickness of the second diffusion layer formed between the second layer and the third layer are set to at least 0.5 μm. Thus, the thicknesses of the first and second diffusion layers containing Ni—Cu alloys higher in electrical resistance than the pure Cu Ni and the pure Cu are guaranteed, whereby the first and second diffusion layers can be made to generate heat to an extent not damaging weldability when a battery negative electrode lead material consisting of the aforementioned clad material is resistance-welded to a battery negative electrode. Consequently, heat of dissolution necessary for the resistance welding can be generated, whereby welding strength between the battery negative electrode lead material and the battery negative electrode can be ensured. Further, the thicknesses of the first and second diffusion layers are set to not more than 3.5 μm. Thus, the thicknesses of the first and second diffusion layers containing the Ni—Cu alloys higher in electrical resistance than the pure Cu Ni and the pure Cu can be inhibited from increasing beyond necessity, whereby electrical resistance of the clad material can also be inhibited from increasing beyond necessity. Consequently, the battery negative electrode lead material can be inhibited from increase in electrical loss. These contents have been experimentally confirmed.

In the aforementioned clad material for a battery negative electrode lead material according to the first aspect, a dispersion in the thickness of the first diffusion layer and a dispersion in the thickness of the second diffusion layer are preferably not more than 1.3 µm. According to this structure, the clad material for a battery negative electrode lead material can be inhibited from uneven distribution of regions where the thicknesses of the first and second diffusion layers are extremely small or extremely large due to dispersions in the thicknesses of the diffusion layers. As hereinabove described, the electrical resistance of the battery negative electrode lead material is increased if the thicknesses of the diffusion layers are large, while the welding strength between the battery negative electrode lead material and the battery negative electrode is reduced if the thicknesses of the diffusion layers are small. When the thicknesses of the diffusion layers are dispersed, therefore, the electrical resistance is increased in the regions where the thicknesses of the diffusion layers are large, to easily increase the electrical resistance or the quantity of heat generation in the battery. In the regions where the thicknesses of the diffusion layers are small, on the other hand, a welded portion of the battery negative electrode lead material easily comes off due to an impact or vibration applied to the battery as a result of reduction in the welding strength. Thus, dispersions in the thicknesses of the diffusion layers result in a dispersion in the battery quality, and hence such dispersions are so suppressed that the battery quality can be stabilized by inhibiting the battery negative electrode lead material from increase in the electrical resistance or reduction in the welding strength at the time of resistance welding. The "dispersion in the thickness of the first (second) diffusion layer" indicates the absolute value of the difference between the maximum and minimum thicknesses of the first (second) diffusion layer measured on a plurality of different points (a plurality of regions) in the longitudinal direction of the clad material.

In this case, a dispersion in the thickness of the first diffusion layer and a dispersion in the thickness of the second diffusion layer are preferably not more than 1.0 µm. According to this structure, the battery negative electrode lead material can be further inhibited from increase in the electrical resistance or reduction in the welding strength at the time of resistance welding, thereby increasing the effect of stabilizing the battery quality.

In the aforementioned clad material for a battery negative electrode lead material according to the first aspect, the thickness of the first diffusion layer and the thickness of the second diffusion layer are preferably at least 0.5 µm and not more than 2.0 µm. According to this structure, the effect of suppressing electrical loss in the battery negative electrode lead material is increased while ensuring welding strength between the battery negative electrode lead material and the battery negative electrode.

In the aforementioned clad material for a battery negative electrode lead material according to the first aspect, the thickness of the second layer is preferably larger than the thickness of the first layer and the thickness of the third layer. According to this structure, conductivity of the battery negative electrode lead material can be improved due to the thickness of the second layer, constituted of the pure Cu having small electrical resistance, larger than the thicknesses of the first and third layers.

A method of manufacturing a clad material for a battery negative electrode lead material according to a second aspect of the present invention includes the steps of preparing a clad material by rolling a first layer constituted of pure Ni containing at least 99.0 mass % of Ni, a second layer constituted of pure Cu containing at least 99.75 mass % of Cu and a third layer constituted of pure Ni containing at least 99.0 mass % of Ni in a state stacked in this order thereby bonding the first layer, the second layer and the third layer to each other and forming a first diffusion layer having a thickness of at least 0.5 µm and not more than 3.5 µm between the first layer and the second layer and a second diffusion layer having a thickness of at least 0.5 µm and not more than 3.5 µm between the second layer and the third layer by holding the clad material under a temperature condition of at least 650° C. and not more than 850° C. for at least 10 seconds and not more than 5 minutes and continuously heat-treating the clad material while transporting the clad material into a continuous furnace. According to this structure, electrical loss in a battery negative electrode lead material can be suppressed while ensuring welding strength between the battery negative electrode lead material and a battery negative electrode.

In the method of manufacturing a clad material for a battery negative electrode lead material according to the second aspect of the present invention, a heat treatment effect on the clad material is further uniformized by continuously heat-treating the clad material while transporting the same. Dispersions in the thicknesses of the diffusion layers result in a dispersion in the battery quality, and hence such dispersions are so suppressed that the battery quality can be stabilized by further uniformizing the thicknesses of the diffusion layers and suppressing dispersions thereby inhibiting the battery negative electrode lead material from increase in the electrical resistance or reduction in the welding strength at the time of resistance welding. In a batch-type heating furnace, on the contrary, mass productivity is generally improved by introducing a large-size coil, and hence a heating chamber is increased in size. When a heater is set on the outer periphery of the heating chamber, the outer and inner sides of the coil are close to and far from the heater respectively. Portions close to and far from the coil are quick and slow in heat transfer respectively, to easily lead to difference in the rate of temperature increase or to temperature difference in the heating furnace. Thus, diffusion layers are formed with nonuniform thicknesses, tending to result in dispersions in the thicknesses. Therefore, the electrical resistance of the battery negative electrode lead material is easily increased, or the welding strength is easily reduced at the time of resistance welding.

Preferably in the aforementioned method of manufacturing a clad material for a battery negative electrode lead material according to the second aspect, heat treatment is so performed in the step of forming the first diffusion layer and the second diffusion layer that the pure Ni of the first layer is diffused into the second layer and the pure Cu of the second layer is diffused into the first layer thereby forming the first diffusion layer containing an Ni—Cu alloy and that the pure Cu of the second layer is diffused into the third layer and the pure Ni of the third layer is diffused into the second layer thereby forming the second diffusion layer containing an Ni—Cu alloy. Thus, the first and second diffusion layers containing the Ni—Cu alloys can be reliably formed by diffusing the metallic elements constituting the first, second and third layers respectively by the heat treatment.

In the aforementioned method of manufacturing a clad material for a battery negative electrode lead material according to the second aspect, the clad material is preferably held under the temperature condition of at least 650° C. and not more than 850° C. for at least 10 seconds and not more than 3 minutes and continuously heat-treated in the step of forming the first diffusion layer and the second diffusion layer. According to this structure, prolongation of the heat treatment time can be suppressed, whereby the clad material for a battery negative electrode lead material can be inhibited from reduction in productivity.

In this case, the clad material is preferably held under a temperature condition of at least 700° C. and not more than 850° C. for at least 10 seconds and not more than 3 minutes and continuously heat-treated in the step of forming the first diffusion layer and the second diffusion layer. According to this structure, the heat treatment is performed at a higher temperature, whereby the heat treatment time can be easily reduced. Thus, prolongation of the heat treatment time can be easily suppressed, whereby the clad material for a battery negative electrode lead material can be inhibited from reduction in productivity.

In the aforementioned manufacturing method heat-treating the clad material under the temperature condition of at least 700° C. and not more than 850° C., the clad material is preferably held under a temperature condition of at least 800° C. and not more than 850° C. for at least 10 seconds and less than 1 minute and continuously heat-treated in the step of forming the first diffusion layer and the second diffusion layer. According to this structure, the heat treatment time can be further reduced. Consequently, the clad material for a battery negative electrode lead material can be further inhibited from reduction in productivity.

In the aforementioned method of manufacturing a clad material for a battery negative electrode lead material according to the second aspect, the clad material is preferably so continuously heat-treated in the step of forming the first diffusion layer and the second diffusion layer that a dispersion in the thickness of the first diffusion layer and a dispersion in the thickness of the second diffusion layer are not more than 1.3 μm. According to this structure, unintentional increase in the electrical resistance of the battery negative electrode lead material or reduction in the welding strength at the time of resistance welding can be suppressed.

In this case, the clad material is preferably so continuously heat-treated in the step of forming the first diffusion layer and the second diffusion layer that a dispersion in the thickness of the first diffusion layer and a dispersion in the thickness of the second diffusion layer are not more than 1.0 μm. According to this structure, unintentional increase in the electrical resistance of the battery negative electrode lead material or reduction in the welding strength at the time of resistance welding can be further suppressed.

In the aforementioned method of manufacturing a clad material for a battery negative electrode lead material according to the second aspect, the clad material is preferably so continuously heat-treated in the step of forming the first diffusion layer and the second diffusion layer that the thickness of the first diffusion layer and the thickness of the second diffusion layer are at least 0.5 μm and not more than 2.0 μm. According to this structure, an effect of suppressing electrical loss in the battery negative electrode lead material is improved while ensuring the welding strength between the battery negative electrode lead material and the battery negative electrode.

In the aforementioned method of manufacturing a clad material for a battery negative electrode lead material according to the second aspect, the step of preparing the clad material preferably includes the steps of forming a bonded material by bonding the first layer, the second layer and the third layer to each other by rolling, performing heat treatment on the bonded material, and preparing the clad material by rolling the bonded material subjected to the heat treatment. According to this structure, the heat treatment for forming the first and second diffusion layers is performed after the formation of the clad material separately from the heat treatment on the bonded material for forming the clad material, whereby the first and second diffusion layers having sufficient thicknesses of at least 0.5 μm and not more than 3.5 μm can be reliably formed on the clad material despite the rolling for forming the clad material.

The aforementioned method of manufacturing a clad material for a battery negative electrode lead material according to the second aspect preferably further includes a step of performing skin pass rolling on the clad material provided with the first diffusion layer and the second diffusion layer. According to this structure, the clad material provided with the first and second diffusion layers can be hardened, whereby handleability of the battery negative electrode lead material can be improved.

A battery according to a third aspect of the present invention includes a battery negative electrode lead material constituted of a clad material of a three-layer structure prepared by stacking a first layer constituted of pure Ni containing at least 99.0 mass % of Ni, a second layer constituted of pure Cu containing at least 99.75 mass % of Cu and a third layer constituted of pure Ni containing at least 99.0 mass % of Ni in this order and a battery negative electrode, constituted of an Ni-plated steel plate or an Ni—Fe alloy, to which the battery negative electrode lead material is resistance-welded in a state where the first layer or the third layer is in contact therewith, while the thickness of a first diffusion layer formed between the first layer and the second layer and the thickness of a second diffusion layer formed between the second layer and the third layer are at least 0.5 μm and not more than 3.5 μm in the battery negative electrode lead material.

In the battery according to the third aspect of the present invention, the aforementioned clad material for a battery negative electrode lead material according to the first aspect is so employed that a battery ensuring welding strength between a battery negative electrode lead material and a battery negative electrode can be obtained, and the battery negative electrode lead material can be inhibited from increase in electrical loss.

In the aforementioned battery according to the third aspect, a dispersion in the thickness of the first diffusion layer and a dispersion in the thickness of the second diffusion layer are preferably not more than 1.3 μm. According to this structure, dispersions in the thicknesses of the diffusion layers are so suppressed that battery quality can be stabilized by inhibiting the battery negative electrode lead material from increase in the electrical resistance or reduction in the welding strength at the time of resistance welding.

In this case, a dispersion in the thickness of the first diffusion layer and a dispersion in the thickness of the second diffusion layer are preferably not more than 1.0 μm. According to this structure, the effect of stabilizing the battery quality is increased by further inhibiting the battery negative electrode lead material from increase in the electrical resistance or reduction in the welding strength at the time of resistance welding.

In the aforementioned battery according to the third aspect, the thickness of the first diffusion layer and the thickness of the second diffusion layer are preferably at least 0.5 μm and not more than 2.0 μm. According to this structure, an effect of suppressing electrical loss in the battery negative electrode lead material is increased while ensuring the welding strength between the battery negative electrode lead material and the battery negative electrode.

The foregoing and other objects, features, aspects and advantages of the present invention will become more

DESCRIPTION OF THE PREFERRED EMBODIMENTS

An embodiment of the present invention is now described with reference to the drawings.

First, the structure of a battery 100 employing a battery negative electrode lead material 5 (hereinafter referred to as a "negative electrode lead material 5") according to the embodiment of the present invention is described with reference to FIGS. 1 to 3.

(Structure of Battery)

Figure 1:
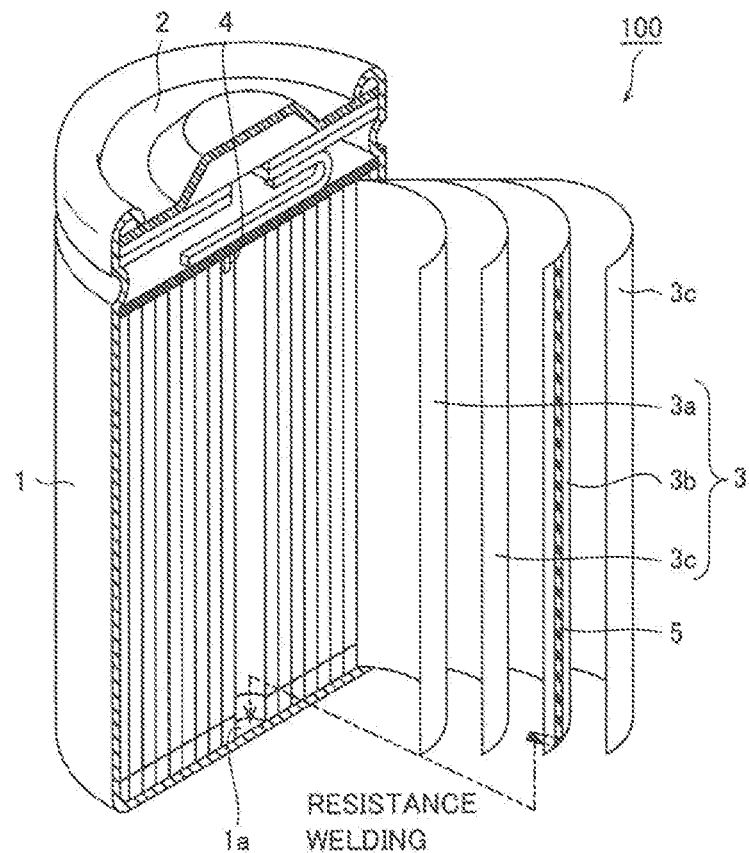
FIG. 1 is a schematic sectional view showing a battery according to an embodiment of the present invention.

The battery 100 according to the embodiment of the present invention is the so-called cylindrical lithium ion battery, as shown in FIG. 1. This battery 100 includes a cylindrical housing 1, a lid member 2 sealing an opening of the housing 1 and a power generation element 3 arranged in the housing 1. The housing 1 is constituted of an Ni-plated steel plate, and serves also as a negative electrode terminal (a battery negative electrode) of the battery 100. The housing 1 may alternatively be constituted of an Ni—Fe alloy.

The housing 1 stores the power generation element 3 and an electrolyte (not shown). The lid member 2 is constituted of an aluminum alloy or the like, and serves also as a positive electrode terminal (a battery positive electrode) of the battery 100. The power generation element 3 is formed by winding a positive electrode foil 3a, a negative electrode foil 3b and an insulative separator 3c arranged between the positive and negative electrode foils 3a and 3b. The positive electrode foil 3a consists of an aluminum foil coated with a positive electrode active material (not shown) such as lithium manganate. The negative electrode foil 3b consists of a copper foil coated with a negative electrode active material (not shown) such as carbon.

The battery 100 further includes a positive electrode lead material 4 for connecting the positive electrode foil 3a and the positive terminal (the lid member 2) with each other and a negative electrode lead material 5 (shown by thick slant lines in FIG. 1) for connecting the negative electrode foil 3b and the battery negative electrode (the housing 1) with each other. As shown in FIG. 2, the negative electrode lead material 5 is welded to the negative electrode foil 3b by ultrasonic welding, whereby a welded portion 6a resulting from solid-phase welding is formed on the interface between the negative electrode foil 3b and the negative electrode lead material 5. Further, the negative electrode lead material 5 is welded to an inner bottom surface 1a of the housing 1 by resistance welding, whereby another welded portion 6b resulting from mutual fusion is formed on the interface between the housing 1 and the negative electrode lead material 5.

The positive electrode lead material 4 shown in FIG. 1 is welded to the positive electrode foil 3a by ultrasonic welding, and also welded to the lid member 2 by resistance welding. The positive electrode lead material 4 is constituted of an aluminum foil in the form of a flat plate.

<Structure of Negative Electrode Lead Material>

Figure 3:
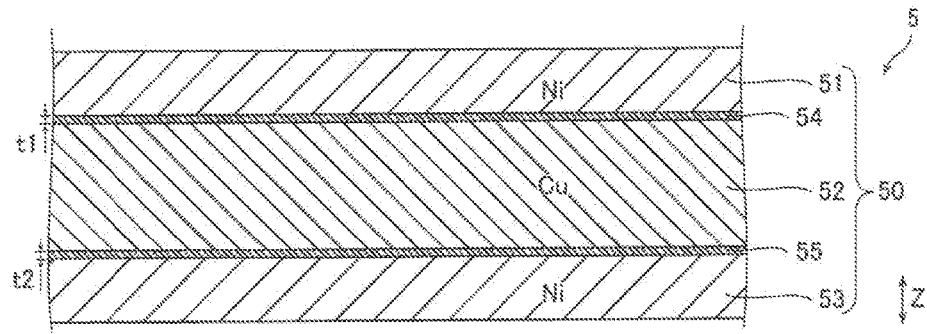
FIG. 3 is an enlarged sectional view showing the battery negative electrode lead material according to the embodiment of the present invention.

The negative electrode lead material 5 is formed by cutting a clad material 50 of a three-layer structure (a five-layer structure including diffusion layers 54 and 55 described later) into a prescribed length, as shown in FIG. 3. The clad material 50 of the three-layer structure is formed by diffusion-bonding an Ni layer 51, a Cu layer 52 and an Ni layer 53 stacked in this order. The Ni layers 51 and 53 are positioned on both surface layers of the negative electrode lead material 5, thereby improving corrosion resistance of the negative electrode lead material 5 and weldability to the housing 1 constituted of the Ni-plated steel plate. The clad material 50 is provided in the form of a thin plate having a length of about 0.1 mm in the thickness direction (along arrow Z). The clad material 50 is an example of the "clad material for a battery negative electrode lead material" in the present invention, while the Ni layer 51, the Cu layer 52 and the Ni layer 53 are examples of the "first layer", the "second layer" and the "third layer" in the present invention respectively.

Both of the Ni layers 51 and 53 are constituted of the so-called pure Ni containing at least 99.0 mass % of Ni. For example, the Ni layers 51 and 53 are constituted of NW2200 or NW2201 defined according to JIS H4551. Preferably, the Ni layers 51 and 53 consist of the same material, and have substantially identical thicknesses.

Figure 4:
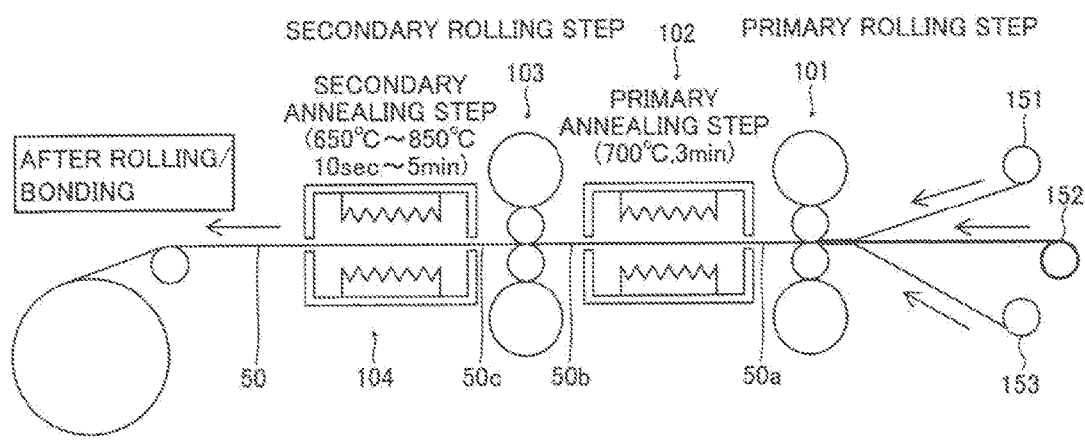
FIG. 4 is a schematic diagram showing a method of manufacturing the battery negative electrode lead material according to the embodiment of the present invention.

The Cu layer 52 is constituted of the so-called pure Cu containing at least 99.75 mass % of Cu and having small electrical resistance. For example, the Cu layer 52 is constituted of C1020 (oxygen-free copper), C1100 (tough pitch copper), C1201 (phosphorus-deoxidized copper) or C1220 (phosphorus-deoxidized copper) defined according to JIS H3100. In order to improve conductivity of the negative electrode lead material 5, the thickness t3 of the Cu layer 52 is preferably larger than the thicknesses t4 and t5 of the Ni layers 51 and 53. For example, the thickness t3 of the Cu layer 52 is at least 1.5 times the thicknesses t4 and t5 of the Ni layers 51 and 53. FIGS. 1 and 4 omit illustration of the Ni layer 51, the Cu layer 52 and the Ni layer 53.

According to this embodiment, the diffusion layers 54 and 55 are formed on the interfaces between the Ni layer 51 and the Cu layer 52 and between the Cu layer 52 and the Ni layer 53 respectively. Ni in the Ni layer 51 moves toward the Cu layer 52 while Cu in the Cu layer 52 moves toward the Ni layer 51 due to annealing (heat treatment) in a manufacturing step for the clad material 50, thereby forming the diffusion layer 54 on the interface between the Ni layer 51 and the Cu layer 52. Similarly, Ni in the Ni layer 53 moves toward the Cu layer 52 while Cu in the Cu layer 52 moves toward the Ni layer 53 due to the annealing in the manufacturing step for the clad material 50, thereby forming the diffusion layer 55 on the interface between the Cu layer 52 and the Ni layer 53. In other words, the diffusion layers 54 and 55 contain Ni—Cu alloys constituted of Ni and Cu. FIGS. 1, 2, 4 and 5 omit illustration of the diffusion layers 54 and 55. The diffusion layers 54 and 55 are examples of the "first diffusion layer" and the "second diffusion layer" in the present invention respectively.

The Ni—Cu alloys constituting the diffusion layers 54 and 55 are higher in electrical resistance as compared with the pure Ni constituting the Ni layers 51 and 53 and the pure Cu constituting the Cu layer 52. Thus, the diffusion layers 54 and 55 mainly generate heat to result in generation of heat of dissolution at the time of resistance welding between the negative electrode lead material 5 and the housing 1, thereby melting the Ni layer 53 (the negative electrode lead material 5) and the housing 1 and welding the same to each other.

The boundaries between the Ni layer 51 and the diffusion layer 54, between the Ni layer 53 and the diffusion layer 55, between the Cu layer 52 and the diffusion layer 54 and between the Cu layer 52 and the diffusion layer 55 can be easily recognized according to composition analysis in the vicinity of the interlaminar interfaces with energy dispersive X-ray spectroscopy (EDX). In other words, positions exhibiting maximum rates of change of compositions in the vicinity of the interlaminar interfaces can be regarded as the boundaries between the layers 51 to 55 on the basis of the composition analysis. More simply, boundaries confirmable through observation of sectional photographs with a scanning electron microscope (SEM) may be regarded as the boundaries between the layers 51 to 55.

The diffusion layers 54 and 55 have the thicknesses t1 and t2 in the thickness direction (along arrow Z) of the clad material 50 respectively. Each of the thicknesses t1 and t2 of the diffusion layers 54 and 55 is the average of thicknesses of the diffusion layer 54 or 55 measured on a plurality of different points (a plurality of regions) in the longitudinal direction of the clad material 50.

According to this embodiment, both of the thicknesses t1 and t2 of the diffusion layers 54 and 55 are at least 0.5 µm and not more than 3.5 µm. If the thicknesses t1 and t2 of the diffusion layers 54 and 55 are less than 0.5 µm, sufficient heat of dissolution is not generated due to small heating values, leading to reduction in the welding strength between the negative electrode lead material 5 and the housing 1. If the thicknesses t1 and t2 of the diffusion layers 54 and 55 are in excess of 3.5 µm, on the other hand, electrical resistance (volume resistivity) in the whole negative electrode lead material 5 is increased due to high electrical resistance of the diffusion layers 54 and 55, leading to large electrical loss in the negative electrode lead material 5. The thicknesses t1 and t2 of the diffusion layers 54 and 55 are more preferably at least 0.5 µm and not more than about 2.0 µm.

According to this embodiment, both of dispersions in the thicknesses t1 and t2 of the diffusion layers 54 and 55 are not more than about 1.3 µm. The dispersions in the thicknesses t1 and t2 of the diffusion layers 54 and 55 are preferably smaller in order not to cause individual difference in the negative electrode lead material 5, and preferably not more than about 1.0 µm. Each of the dispersions in the thicknesses t1 and t2 of the diffusion layers 54 and 55 indicates the absolute value of the difference between the maximum and minimum thicknesses of the diffusion layer 54 or 55 measured on a plurality of different points (a plurality of regions) in the longitudinal direction of the clad material 50.

Effects of Embodiment

According to this embodiment, the following effects can be attained:

According to this embodiment, as hereinabove described, the thicknesses t1 and t2 of the diffusion layers 54 and 55 formed between the Ni layer 51 and the Cu layer 52 and between the Cu layer 52 and the Ni layer 53 respectively are set to at least 0.5 µm. Thus, the thicknesses t1 and t2 of the diffusion layers 54 and 55 containing the Ni—Cu alloys higher in electrical resistance than pure Cu Ni and pure Cu are guaranteed, whereby the diffusion layers 54 and 55 can be made to generate heat to an extent not damaging weldability at the time of the resistance welding. Consequently, heat of dissolution necessary for the resistance welding can be sufficiently generated, whereby the welding strength between the negative electrode lead material 5 and the battery negative electrode (the housing 1) can be sufficiently ensured.

According to this embodiment, the thicknesses t1 and t2 of the diffusion layers 54 and 55 are set to not more than 3.5 µm. Thus, the thicknesses t1 and t2 of the diffusion layers 54 and 55 containing the Ni—Cu alloys higher in electrical resistance than pure Cu Ni and pure Cu can be inhibited from increasing beyond necessity respectively, whereby the electrical resistance of the clad material 50 can also be inhibited from increasing beyond necessity. Consequently, the negative electrode lead material 5 can be inhibited from increase in electrical loss.

According to this embodiment, dispersions in the thicknesses t1 and t2 of the diffusion layers 54 and 55 are set to not more than about 1.3 µm. Thus, the clad material 50 can be inhibited from uneven distribution of regions where no diffusion layers 54 and 55 are formed or regions where the thicknesses t1 and t2 of the diffusion layers 54 and 55 are extremely small or extremely large due to dispersions in the thicknesses t1 and t2 of the diffusion layers 54 and 55. Thus, battery quality can be stabilized by inhibiting the negative electrode lead material 5 from increase in the electrical resistance or reduction in the welding strength at the time of the resistance welding.

According to this embodiment, dispersions in the thicknesses t1 and t2 of the diffusion layers 54 and 55 are set to not more than about 1.0 µm. According to this structure, the negative electrode lead material 5 can be further inhibited from increase in the electrical resistance or reduction in the welding strength at the time of the resistance welding, thereby increasing the effect of stabilizing the battery quality.

According to this embodiment, the thicknesses t1 and t2 of the diffusion layers 54 and 55 are preferably set to at least 0.5 µm and not more than about 2.0 µm. According to this structure, the effect of suppressing electrical loss in the negative electrode lead material 5 is increased while sufficiently ensuring the welding strength between the negative electrode lead material 5 and the battery negative electrode (the housing 1).

According to this embodiment, the negative electrode lead material 5 is welded by the resistance welding in the state where the Ni layer 53 is in contact with the battery negative electrode (the housing 1) constituted of the Ni-plated steel plate. Thus, the battery negative electrode (the housing 1) is constituted of the Ni-plated steel plate having excellent weldability to the Ni layer 53 constituted of the pure Ni, whereby the welding strength between the negative electrode lead material 5 and the battery negative electrode can be further increased.

According to this embodiment, the thickness t3 of the Cu layer 52 constituted of the pure Cu having small electrical resistance is rendered larger than the thicknesses t4 and t5 of the Ni layers 51 and 53. According to this structure, conductivity of the negative electrode lead material 5 can be improved.

(Manufacturing Method)

A method of manufacturing the negative electrode lead material 5 according to the embodiment of the present invention and a method of manufacturing the battery 100 employing the negative electrode lead material 5 are now described with reference to FIGS. 1 to 5.

<Method of Manufacturing Negative Electrode Lead Material>

First, a pair of rolled Ni plates 151 and 153 constituted of pure Ni and a rolled Cu plate 152 constituted of pure Cu are prepared, as shown in FIG. 4. Then, the Ni plate 151, the Cu plate 152 and the Ni plate 153 are transported toward a first pressure roller 101 while rewinding the same respectively. Then, the Ni plate 151, the Cu plate 152 and Ni plate 153 transported in a state stacked in this order are continuously rolled with the first pressure roller 101 at a prescribed draft (a primary rolling step). Thus, an elongational bonded material 50a is continuously formed by bonding the Ni layer 51, the Cu layer 52 and the Ni layer 53 (see FIG. 3) to each other in this order. At this time, diffusion layers are hardly formed on the interfaces between the Ni layer 51 and the Cu layer 52 and between the Cu layer 52 and the Ni layer 53.

Then, the elongational bonded material 50a is transported into a first continuous annealing furnace 102. The first continuous annealing furnace 102 is maintained in a temperature environment of about 700° C., and the elongational bonded material 50a transported thereinto is continuously heat-treated and annealed (a primary annealing step). Then, a primarily annealed (heat-treated) elongational bonded material 50b is continuously discharged from the first continuous annealing furnace 102. In the primarily annealed elongational bonded material 50b, the diffusion layers 54 and 55 are formed on the interfaces between the Ni layer 51 and the Cu layer 52 and between the Cu layer 52 and the Ni layer 53. The transportation speed for the bonded material 50a and the transportation path length in the first continuous annealing furnace 102 are so set that the annealing time for the bonded material 50a in the first continuous annealing furnace 102 is about 3 minutes.

Thereafter the elongational bonded material 50b is cold-rolled with a second pressure roller 103 (a secondary rolling step). Thus, an elongational clad material 50c rolled into a desired thickness is continuously formed. At this time, the thicknesses t1 and t2 of the diffusion layers 54 and 55 formed in the primary annealing step are extremely reduced similarly to the rate of reduction of the thickness of the whole bonded material 50b, due to the cold rolling.

In the manufacturing process according to this embodiment, the elongational clad material 50c is transported into a second continuous annealing furnace 104. The second continuous annealing furnace 104 is maintained in a prescribed temperature environment of at least 650° C. and not more than 850° C., and the elongational clad material 50c transported thereinto is continuously heat-treated and annealed (a secondary annealing step). Then, the elongational clad material 50 in which the Ni layer 51, the Cu layer 52 and the Ni layer 53 are diffusion-bonded to each other in the state stacked in this order is continuously discharged from the second continuous annealing furnace 104. The transportation speed for the clad material 50c and the transportation path length in the second continuous annealing furnace 104 are so set that the clad material 50c is annealed in the second continuous annealing furnace 104 for a prescribed time of at least 10 seconds and not more than 5 minutes. The annealing time in the second continuous annealing furnace 104 is preferably at least 10 seconds and not more than about 3 minutes. The temperature environment in the second continuous annealing furnace 104 is preferably at least about 700° C. and not more than 850° C., and the annealing time is preferably at least 10 seconds and not more than about 3 minutes in this case. Further, the temperature environment in the second continuous annealing furnace 104 is more preferably at least about 800° C. and not more than 850° C., while the annealing time is preferably at least 10 seconds and not more than about 3 minutes, and more preferably at least 10 seconds and not more than about 1 minute in this case.

In the secondarily annealed clad material 50, Ni in the Ni layer 51 moves toward the Cu layer 52 while Cu in the Cu layer 52 moves toward the Ni layer 51 due to the secondary annealing, thereby forming the diffusion layer 54 having the thickness t1 of at least 0.5 µm and not more than 3.5 µm on the interface between the Ni layer 51 and the Cu layer 52, as shown in FIG. 3. Further, Ni in the Ni layer 53 moves toward the Cu layer 52 while Cu in the Cu layer 52 moves toward the Ni layer 53 due to the secondary annealing, thereby forming the diffusion layer 55 having the thickness t2 of at least 0.5 µm and not more than 3.5 µm on the interface between the Cu layer 52 and the Ni layer 53. The diffusion layers 54 and 55 are so formed that dispersions in the thicknesses t1 and t2 thereof are not more than about 1.3 µm. In the secondarily annealed clad material 50, the thicknesses t1 and t2 of the diffusion layers 54 and 55 are preferably at least 0.5 µm and not more than about 2.0 µm. Further, dispersions in the thicknesses t1 and t2 of the diffusion layers 54 and 55 are preferably not more than about 1.0 µm.

Finally, the elongational clad material 50 is so wound as to form the rolled (elongational) clad material 50, as shown in FIG. 4. Thereafter the negative electrode lead material 5 shown in FIG. 1 is formed by performing cutting such as slitting.

<Method of Manufacturing Battery>

Figure 2:
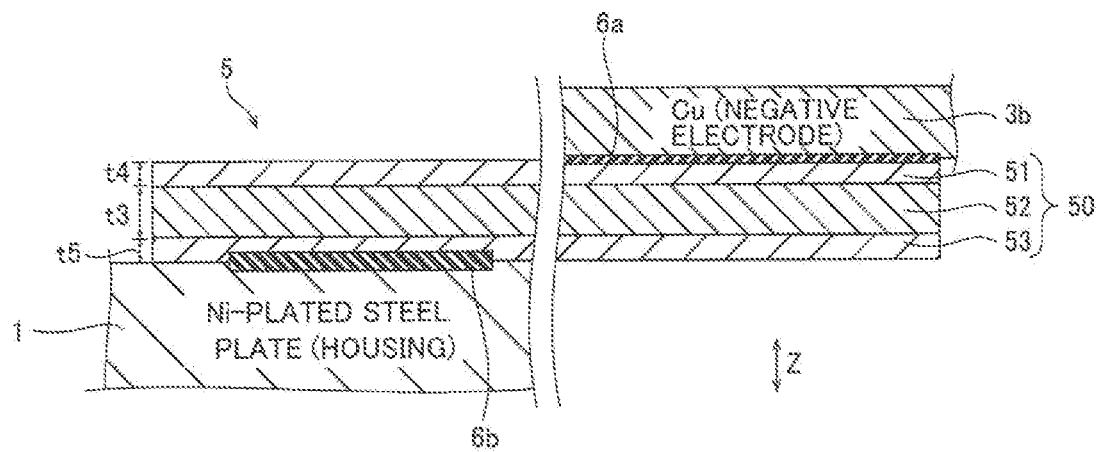
FIG. 2 is a sectional view showing a welded state between a battery negative electrode lead material, a battery negative electrode and a housing according to the embodiment of the present invention.
Figure 5:
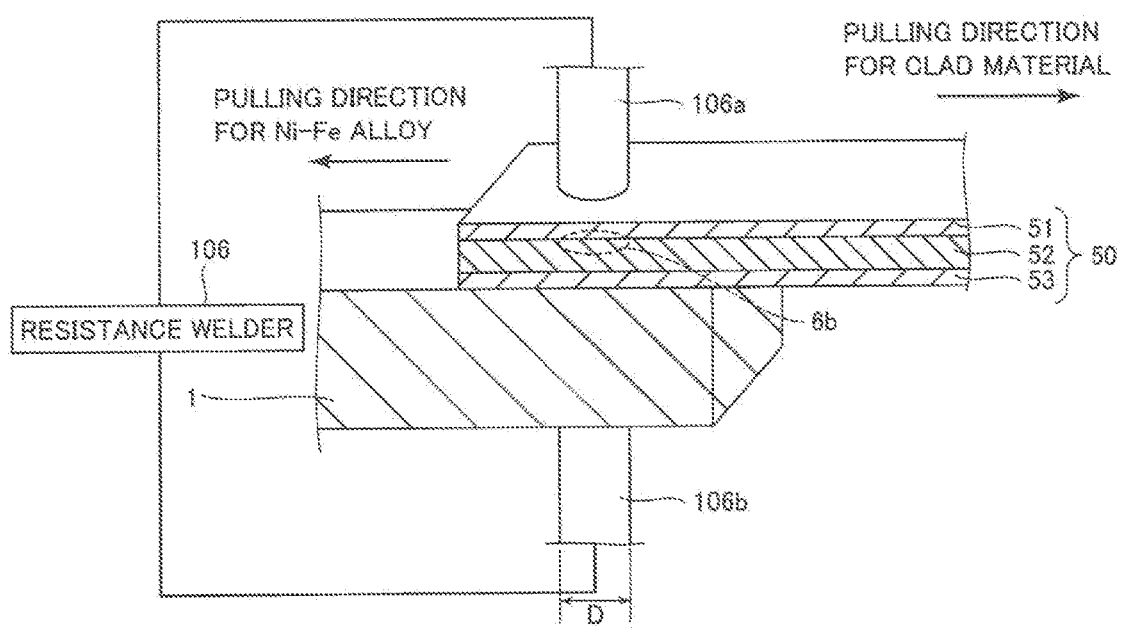
FIG. 5 is a sectional view schematically showing resistance welding between the battery negative electrode lead material and the housing according to the embodiment of the present invention.

As shown in FIG. 2, regions of the negative electrode lead material 5 excluding the periphery of one end portion thereof are welded to the negative electrode foil 3b of the power generation element 3 by ultrasonic welding. Thereafter the periphery of one end portion of the negative electrode lead material 5 is resistance-welded to the inner side of the housing 1, as shown in FIG. 5. At this time, the surface of either one (the Ni layer 51 in FIG. 5) of the Ni layers 51 and 53 of the negative electrode lead material 5 is brought into contact with an electrode 106a of a resistance welder 106, while the surface of the other one (the Ni layer 53 in FIG. 5) of the Ni layers 51 and 53 is brought into contact with the inner bottom surface 1a (see FIG. 1) of the housing 1. Then, a voltage is applied for a prescribed time in a state bringing another electrode 106b of the resistance welder 106 into contact with the outer surface of the housing 1. Thus, large heat of dissolution is generated in the diffusion layers 54 and 55 having high electrical resistance, to weld the negative electrode lead material 5 and the housing 1 to each other as shown in FIG. 2. Further, the positive electrode lead material 4, the positive electrode foil 3a and the lid member 2 are welded to each other. Thereafter an electrolyte (not shown) is injected into the housing 1, to weld the housing 1 and the lid member 2 to each other. Thus, the battery 100 shown in FIG. 1 is prepared.

Effects of Manufacturing Method According to Embodiment

In the manufacturing method according to this embodiment, the following effects can be attained:

In the manufacturing method according to this embodiment, as hereinabove described, the heat treatment (the secondary annealing) is so continuously performed while transporting the clad material 50c that a heat treatment effect on the clad material 50 can be further uniformized. Dispersions in the thicknesses t1 and t2 of the diffusion layers 54 and 55 lead to a dispersion in battery quality, and hence the thicknesses t1 and 52 of the diffusion layers 54 and 55 are so uniformized and inhibited from dispersions that the battery quality can be stabilized by inhibiting the battery negative electrode lead material 5 from increase in the electrical resistance or reduction in the welding strength at the time of the resistance welding.

In the manufacturing method according to this embodiment, the pure Ni in the Ni layer 51 is diffused into the Cu layer 52 while the pure Cu in the Cu layer 52 is diffused into the Ni layer 51 thereby forming the diffusion layer 54 containing the Ni—Cu alloy and the pure Cu in the Cu layer 52 is diffused into the Ni layer 53 while the pure Ni in the Ni layer 53 is diffused into the Cu layer 52 thereby forming the diffusion layer 55 containing the Ni—Cu alloy due to the secondary annealing in the step of forming the diffusion layers 54 and 55. Thus, the diffusion layers 54 and 55 containing the Ni—Cu alloys can be reliably formed by diffusing the metallic elements constituting the Ni layer 51, the Cu layer 52 and the Ni layer 53 respectively by the heat treatment.

In the manufacturing method according to this embodiment, the clad material 50c is preferably held under the temperature condition of at least 650° C. and not more than 850° C. for at least 10 seconds and not more than about 3 minutes and continuously heat-treated (secondarily annealed) in the step of forming the diffusion layers 54 and 55. According to this structure, prolongation of the heat treatment time can be suppressed, whereby the clad material 50 can be inhibited from reduction in productivity. More preferably, the clad material 50c is held under the temperature condition of at least about 700° C. and not more than 850° C. for at least 10 seconds and less than about 3 minutes and continuously heat-treated (secondarily annealed) in the step of forming the diffusion layers 54 and 55. Further preferably, the clad material 50c is held under the temperature condition of at least about 800° C. and not more than 850° C. for at least 10 seconds and less than about 1 minute and continuously heat-treated (secondarily annealed) in the step of forming the diffusion layers 54 and 55. According to this structure, the heat treatment is performed at a higher temperature, whereby the heat treatment time can be further reduced. Thus, prolongation of the heat treatment time can be easily suppressed, whereby the negative electrode lead material 5 can be inhibited from reduction in productivity.

In the manufacturing method according to this embodiment, the clad material 50c is continuously formed by continuously forming the elongational bonded material 50a by bonding the Ni layer 51, the Cu layer 52 and the Ni layer 53 to each other in this order in the primary rolling step, forming the bonded material 50b by continuously heat-treating and annealing the bonded material 50a in the primary annealing step, and cold-rolling the bonded material 50b in the secondary rolling step. Thereafter the clad material 50 provided with the diffusion layers 54 and 55 is continuously formed in the secondary annealing step. Thus, the heat treatment (the secondary annealing step) for forming the diffusion layers 54 and 55 is performed after the formation of the clad material 50c separately from the heat treatment step (the primary annealing step) on the bonded material 50a for forming the clad material 50c, whereby the diffusion layers 54 and 55 having sufficient thicknesses (t1 and t2) of at least 0.5 μm and not more than 3.5 μm can be reliably formed on the clad material 50 despite the rolling for forming the clad material 50c.

EXAMPLES

An experiment conducted in order to confirm the effects of the aforementioned embodiment is now described with reference to FIGS. 2 to 5. In this experiment, thicknesses of diffusion layers and dispersions therein were confirmed by observing sections of clad materials (negative electrode lead materials), and volume resistivity values of the clad materials were measured. In the experiment, further, welding strength levels were measured when the clad materials and Fe—Ni alloys were resistance-welded to each other.

Compositions of Examples and Comparative Examples

First, a clad material 50 constituting a negative electrode lead material 5 according to Example 1 was prepared. More specifically, a pair of Ni plates 151 and 153 constituted of pure Ni and a Cu plate 152, constituted of pure Cu, having a thickness twice those of the Ni plates 151 and 153 were prepared, as shown in FIG. 4. Then, the Ni plate 151, the Cu plate 152 and the Ni plate 153 were transported in a state stacked in this order and continuously rolled with a first pressure roller 101 at a draft of 60%. Thus, a bonded material 50a, having a thickness of 0.5 mm, including an Ni layer 51, a Cu layer 52 and an Ni layer 53 (see FIG. 3) bonded to each other in this order was continuously formed.

Then, the bonded material 50a was transported into a first continuous annealing furnace 102 maintained in a temperature environment of 700° C. and subjected to primary annealing. At this time, the annealing time (the transportation time in the first continuous annealing furnace 102) for the bonded material 50a was set to 3 minutes. Then, a clad material 50c having a thickness of 0.1 mm was formed by cold-rolling a bonded material 50b continuously discharged from the first continuous annealing furnace 102 after the primary annealing with a second pressure roller 103.

According to Example 1, the cold-rolled clad material 50c was transported into a second continuous annealing furnace 104 maintained in a temperature environment (at an annealing temperature) of 650° C. and subjected to secondary annealing (continuous annealing). At this time, the annealing time (the transportation time in the second continuous annealing furnace 104) for the clad material 50c was set to 3 minutes. Thus, the elongational clad material 50 according to Example 1 was prepared. In the elongational clad material 50 according to Example 1, the thicknesses of the Ni layers 51 and 53 were identical to each other, while the thickness t3 of the Cu layer 52 was twice the thicknesses of the Ni layers 51 and 53.

Elongational clad materials 50 according to Examples 2, 4, 5 and 7 were prepared by continuous annealing similarly to Example 1 (annealed for 3 minutes), except that annealing temperatures in secondary annealing were set to 700° C., 750° C., 800° C. and 850° C. respectively. Further, an elongational clad material 50 according to Example 3 was prepared by continuous annealing similarly to Example 1, except that an annealing temperature and an annealing time in secondary annealing were set to 700° C. and 5 minutes respectively. In addition, an elongational clad material 50 according to Example 6 was prepared by continuous annealing similarly to Example 1, except that an annealing temperature and an annealing time in secondary annealing were set to 850° C. and 10 seconds (0.17 minutes) respectively.

According to comparative example 1, on the other hand, a cold-rolled clad material 50c having a thickness of 0.1 mm was formed similarly to the aforementioned Example 1, and thereafter wound into a rolled shape. Then, the rolled clad material 50c was arranged in a prescribed batch-type heating furnace (not shown), and the temperature in the heating furnace was raised up to 500° C. (an annealing temperature). Then, the clad material 50c was subjected to secondary annealing (batch annealing) by holding the same for 60 minutes after the temperature in the furnace had reached the annealing temperature. Thus, an elongational clad material according to comparative example 1 was prepared.

Elongational clad materials according to comparative examples 2 and 6 were prepared by continuous annealing similarly to Example 1 (annealed for 3 minutes), except that annealing temperatures in secondary annealing were set to 600° C. and 900° C. respectively.

Further, elongational clad materials according to comparative examples 3, 4 and 5 were prepared by batch annealing similarly to comparative example 1 (annealed for 60 minutes), except that annealing temperatures in secondary annealing were set to 600° C., 650° C. and 850° C. respectively. In addition, an elongational clad material according to comparative example 7 was prepared similarly to comparative example 1, except that an annealing temperature and an annealing time in secondary annealing were set to 900° C. and 30 minutes respectively.

Then, sections of the clad materials according to Examples 1 to 7 and comparative examples 1 to 7 were confirmed with an SEM, to obtain the thicknesses of diffusion layers. More specifically, arbitrary three portions in the longitudinal direction of each elongational clad material orthogonal to the thickness direction were selected as measurement ranges. Each of the three measurement ranges had a length of 100 μm in the longitudinal direction. The thicknesses of five portions of each diffusion layer were measured in each of the three measurement ranges, and averages thereof were obtained respectively. Then, the thickness of the diffusion layer of the clad material according to each of Examples 1 to 7 and comparative examples 1 to 7 was obtained by averaging the three average thicknesses of the diffusion layer.

Further, dispersions in the thicknesses of the diffusion layers of the clad materials according to Examples 1 to 7 and comparative examples 1 to 7 were obtained. More specifically, three different arbitrary portions around a first end portion in a section of each elongational clad material in the longitudinal direction were selected as measurement ranges. Each of the three measurement ranges had a length of 100 μm in the longitudinal direction. Then, the average thicknesses of the diffusion layer were obtained in the three measurement ranges respectively. Thereafter the thickness of the diffusion layer around the first end portion of the clad material in the longitudinal direction was obtained by averaging the three average thicknesses of the diffusion layer. Similarly, three different arbitrary portions around a second end portion of the clad material in the longitudinal direction were selected as measurement ranges. Each of the three measurement ranges had a length of 100 μm in the longitudinal direction. Then, the average thicknesses the diffusion layer were obtained in the three measurement ranges respectively. Thereafter the thickness of the diffusion layer around the second end portion of the clad material in the longitudinal direction was obtained by averaging the three average thicknesses of the diffusion layer. Finally, a dispersion in the thickness of the diffusion layer was obtained in each of the clad materials according to Examples 1 to 7 and comparative examples 1 to 7 by calculating the absolute value of the difference between the thicknesses of the diffusion layer around the first and second end portions.

In each of the clad materials according to Examples 1 to 7 and comparative examples 1 to 7, diffusion layers (corresponding to the diffusion layers 54 and 55 shown in FIG. 3) on two portions thereof were conceivably similarly formed, and hence the thickness and the dispersion in the thickness of only one of the diffusion layers were obtained. Further, the volume resistivity of each of the clad materials according to Examples 1 to 7 and comparative examples 1 to 7 was measured according to a four terminal method on the basis of JIS H 0505.

Then, each of the clad materials according to Examples 1 to 7 and comparative examples 1 to 7 was cut into a prescribed size. As shown in FIG. 5, the cut clad material 50 (a negative electrode lead material) according to each of Examples 1 to 7 and comparative examples 1 to 7 was resistance-welded to a plate material of an Ni—Fe alloy, containing 42 mass % of Ni and Fe, corresponding to the housing 1. At this time, the plate material of the Ni—Fe alloy having a thickness of 0.4 mm and an inverter resistance welder 106 (SIW-8000S by Kabushiki Kaisha Seiwa Seisakusho) having a pair of cylindrically formed electrodes 106a and 106b each having a diameter D of 1.5 mm were employed.

More specifically, welded portions of the plate material (the housing 1) of the Ni—Fe alloy and the clad material 50 were stacked to be brought into contact with each other. Then, the electrodes 106a and 106b were brought into contact with an Ni layer 51 of the clad material 50 and the plate material of the Ni—Fe alloy respectively. Then, a voltage was applied in a constant voltage mode while pressing the pair of electrodes 106a and 106b against the clad material 50 and the plate material of the Ni—Fe alloy respectively with pressing force of 49 N. More specifically, pretreatment was first performed by applying a voltage of 0.7 V for 0.5 msec. After a lapse of 1 msec. from the pretreatment, the voltage was linearly raised from 0 V to 1.15 V in 0.5 msec. Thereafter main treatment was performed by applying the voltage of 1.15 V for 6 msec. Thereafter the voltage was linearly reduced from 1.15 V to 0 V in 0.5 msec. The clad material 50 (the negative electrode lead material) was resistance-welded to the plate material of the Ni—Fe alloy through the series of voltage control.

Thereafter the clad material 50 and the plate material (the housing 1) of the Ni—Fe alloy resistance-welded to each other were pulled in pulling directions orthogonal to the thickness direction and opposite to each other (a tensile test). Tensile strength at the time when the clad material was separated from the plate material of the Ni—Fe alloy was regarded as welding strength (N) of a welded portion 6b between the clad material 50 and the plate material of the Ni—Fe alloy.

Experimental Results

TABLE 1

| | ANNEALING TEMPERATURE (° C.) | ANNEALING TIME (min) | TREATMENT METHOD | THICKNESS OF DIFFUSION LAYER (μm) | VOLUME RESISTIVITY (μΩ·cm) | WELDING STRENGTH (N) | DISPERSION IN THICKNESS OF DIFFUSION LAYER (μm) |
|---|---|---|---|---|---|---|---|
| COMPARATIVE EXAMPLE 1 | 500 | 60 | BATCH ANNEALING | 0.4 | 2.7 | 33 | 0.5 |
| COMPARATIVE EXAMPLE 2 | 600 | 3 | CONTINUOUS ANNEALING | 0.4 | 2.7 | 33 | 0.2 |
| COMPARATIVE EXAMPLE 3 | 600 | 60 | BATCH ANNEALING | 3.7 | 2.9 | 47 | 3.2 |
| EXAMPLE 1 | 650 | 3 | CONTINUOUS ANNEALING | 0.7 | 2.7 | 41 | 0.2 |
| COMPARATIVE EXAMPLE 4 | 650 | 60 | BATCH ANNEALING | 4.5 | 3.1 | 47 | 3.8 |
| EXAMPLE 2 | 700 | 3 | CONTINUOUS ANNEALING | 1.0 | 2.8 | 43 | 0.5 |
| EXAMPLE 3 | 700 | 5 | CONTINUOUS ANNEALING | 1.8 | 2.8 | 44 | 0.5 |
| EXAMPLE 4 | 750 | 3 | CONTINUOUS ANNEALING | 2.5 | 2.8 | 45 | 1.2 |
| EXAMPLE 5 | 800 | 3 | CONTINUOUS ANNEALING | 2.8 | 2.8 | 47 | 1.3 |
| EXAMPLE 6 | 850 | 0.17 | CONTINUOUS ANNEALING | 1.7 | 2.8 | 44 | 1.0 |
| EXAMPLE 7 | 850 | 3 | CONTINUOUS ANNEALING | 3.5 | 2.9 | 47 | 1.3 |
| COMPARATIVE EXAMPLE 5 | 850 | 60 | BATCH ANNEALING | 10.3 | 4.3 | 49 | 5.2 |
| COMPARATIVE EXAMPLE 6 | 900 | 3 | CONTINUOUS ANNEALING | 3.8 | 3.0 | 47 | 1.3 |
| COMPARATIVE EXAMPLE 7 | 900 | 30 | BATCH ANNEALING | 9.5 | 4.0 | 48 | 4.9 |
| TARGET CHARACTERISTIC | | | | AT LEAST 0.5 AND NOT MORE THAN 3.5 | NOT MORE THAN 2.9 | AT LEAST 40 | NOT MORE THAN 1.3 |

As obvious from experimental results shown in Table 1, the thicknesses of the diffusion layers were at least 0.5 μm and not more than 3.5 μm in the clad materials according to Examples 1 to 7. Further, the clad materials according to Examples 1 to 7 exhibited small volume resistivity values of not more than 2.9 μΩ·cm and sufficiently large welding strength values of at least 40 N. Thus, it has been confirmable that increase in the volume resistivity values (electrical resistance values) can be suppressed while sufficiently generating heat of dissolution necessary for resistance welding in the clad materials according to Examples 1 to 7. In the clad materials according to Examples 1 to 7, in addition, dispersions in the thicknesses of the diffusion layers were not more than 1.3 μm. Thus, the clad materials according to Examples 1 to 7 conceivably hardly cause unintentional reduction in the welding strength at the time of the resistance welding or increase in the electrical resistance values of the negative electrode lead materials. From these results, it has been confirmable to be possible to prepare a clad material suitable as a battery negative electrode lead material while reducing a heat treatment time by holding the clad material under a temperature condition of at least 650° C. and not more than 850° C. for at least 10 seconds and not more than 5 minutes thereby heat-treating (secondarily annealing) the same.

In the clad materials according to Examples 1 to 3 and 6, the thicknesses of the diffusion layers were at least 0.5 μm and not more than 2.0 μm, the volume resistivity values were not more than 2.8 μΩ·cm, and the welding strength values were at least 41 N. In the clad materials according to Examples 1 to 3 and 6, further, dispersions in the thicknesses of the diffusion layers were not more than 1.0 μm. Thus, an effect of stabilizing battery quality can conceivably be increased by suppressing increase in the electrical resistance of the negative electrode lead material and reduction in the welding strength at the time of the resistance welding.

In the clad materials according to Examples 1, 2 and 4 to 7, the thicknesses of the diffusion layers were at least 0.7 μm and not more than 3.5 μm, the volume resistivity values were not more than 2.9 μΩ·cm, and the welding strength values were at least 41 N. Consequently, it is conceivably possible to ensure welding strength between the battery negative electrode lead material and the battery negative electrode. From these results, it has been confirmable to be possible to prepare a clad material suitable as a battery negative electrode lead material while reducing a heat treatment time by holding the clad material under a temperature condition of at least 650° C. and not more than 850° C. for at least 10 seconds and not more than 3 minutes thereby heat-treating (secondarily annealing) the same.

In the clad materials according to Examples 2 and 4 to 7, the thicknesses of the diffusion layers were at least 1.0 μm and not more than 3.5 μm, the volume resistivity values were not more than 2.9 μΩ·cm, and the welding strength values were at least 43 N. Consequently, it is conceivably possible to further ensure welding strength between the battery negative electrode lead material and the battery negative electrode. From these results, it has been confirmable to be possible to prepare a clad material more suitable as a battery negative electrode lead material while further reducing a heat treatment time by holding the clad material under a temperature condition of at least 700° C. and not more than 850° C. for at least 10 seconds and not more than 3 minutes thereby heat-treating (secondarily annealing) the same.

In the clad material according to Example 6, the thickness of the diffusion layer was at least 0.5 μm and not more than 2.0 μm, the volume resistivity was not more than 2.8 μΩ·cm, the welding strength was at least 41 N, and the dispersion in the thickness of the diffusion layer was not more than 1.0 μm, despite the short annealing time of 10 seconds. Thus, it has been confirmable to be possible to prepare a clad material sufficiently suitable as a battery negative electrode lead material by holding the clad material under a temperature condition of at least 800° C. and not more than 850° C. for at least 10 seconds and not more than 1 minute thereby heat-treating (secondarily annealing) the same, even if the heat treatment time is further reduced.

In the clad materials according to comparative examples 1 and 2, on the other hand, the thicknesses of the diffusion layers were less than 0.5 μm. In the clad materials according to comparative examples 1 and 2, further, the welding strength values were reduced to not more than 40 N, although the volume resistivity values were not more than 2.7 μΩ·cm. In the clad materials according to comparative examples 1 and 2, the welding strength values were conceivably reduced due to insufficient generation of heat of dissolution necessary for resistance welding. In the clad materials according to comparative examples 4 to 7, the thicknesses of the diffusion layers were increased beyond 3.5 μm, while the volume resistivity values were also increased beyond 2.9 μΩ·cm. The clad materials according to comparative examples 4 to 7 are conceivably unsuitable as lead materials for battery negative electrodes since the volume resistivity values (electrical resistance values) are increased to result in large electrical loss. In the clad materials according to comparative examples 3 to 5 and 7, the thicknesses of the diffusion layers were increased beyond 3.5 μm, and dispersions in the thicknesses of the diffusion layers were also increased beyond 1.3 μm. The clad materials according to comparative examples 3 to 5 and 7 are conceivably unsuitable as lead materials for battery negative electrodes since the same conceivably easily cause unintentional reduction in the welding strength at the time of the resistance welding or increase in the electrical resistance values of the negative electrode lead materials, although such disadvantages were not confirmed in the experimental results of the volume resistivity values and the welding strength values.

In each clad material, both of the volume resistivity and the welding strength tended to increase in proportion to the thickness of the diffusion layer. Consequently, it has been confirmable to be necessary to set the thickness of the diffusion layer in a suitable range (i.e., the range where the thickness of the diffusion layer is at least 0.5 μm and not more than 3.5 μm), in order to obtain sufficient welding strength while reducing volume resistivity.

Modifications

The embodiment and Examples disclosed this time must be considered as illustrative in all points and not restrictive. The range of the present invention is shown not by the above description of the embodiment and Examples but by the scope of claims for patent, and all changes (modifications) within the meaning and range equivalent to the scope of claims for patent are included.

For example, while the negative electrode lead material 5 is applied to the lithium ion battery (the battery 100) in the aforementioned embodiment, the present invention is not restricted to this. According to the present invention, the negative electrode lead material may alternatively be applied to a battery other than the lithium ion battery.

While the battery negative electrode (the housing 1) to which the negative electrode lead material 5 is resistance-welded is constituted of the Ni-plated steel plate in the aforementioned embodiment, the present invention is not restricted to this. According to the present invention, the battery negative electrode to which the negative electrode lead material is resistance-welded may alternatively be constituted of an Ni—Fe alloy, or a metallic material other than the Ni-plated steel plate and the Ni—Fe alloy.

According to the present invention, a tertiary rolling step may further be provided after the second annealing step in the aforementioned embodiment so that the thicknesses of the first and second diffusion layers are within the range of at least 0.5 μm and not more than 3.5 μm, in order to slightly harden the clad material after the secondary annealing. Thus, the secondarily annealed clad material is hardened to some extent, whereby the negative electrode lead material can be easily handled when manufacturing the battery or handling the negative electrode lead material. In the tertiary rolling step, the draft and the pressure of the roller may be smaller as compared with those in the primary and secondary rolling steps. In other words, the tertiary rolling step is preferably a step of performing the so-called skin pass rolling on the secondarily annealed clad material provided with the first and second diffusion layers. Thus, the clad material provided with the first and second diffusion layers can be hardened, whereby handleability of the negative electrode lead material can be improved.

While the primary rolling step, the primary annealing step, the secondary rolling step and the second annealing step are continuously carried out in the aforementioned embodiment, the present invention is not restricted to this. According to the present invention, the primary rolling step, the primary annealing step, the secondary rolling step and the second annealing step may alternatively be separately carried out, or two or three of these steps may be continuously carried out.

While two annealing steps (the primary and secondary annealing steps) are carried out in the aforementioned embodiment, the present invention is not restricted to this. According to the present invention, the primary annealing may alternatively be omitted, to carry out only one annealing step.

What is claimed is:

1. A clad material for a battery negative electrode lead material, comprising:
   a clad material of a three-layer structure prepared by stacking a first layer constituted of pure Ni containing at least 99.0 mass % of Ni, a second layer constituted of pure Cu containing at least 99.75 mass % of Cu and a third layer constituted of pure Ni containing at least 99.0 mass % of Ni in this order, wherein
   the thickness of a first diffusion layer formed between the first layer and the second layer and the thickness of a second diffusion layer formed between the second layer and the third layer are at least 0.5 μm and not more than 2.8 μm, and
   a dispersion in the thickness of the first diffusion layer and a dispersion in the thickness of the second diffusion layer are not more than 1.3 μm.

2. The clad material for a battery negative electrode lead material according to claim 1, wherein
a dispersion in the thickness of the first diffusion layer and a dispersion in the thickness of the second diffusion layer are not more than 1.0 μm.

3. The clad material for a battery negative electrode lead material according to claim 1, wherein
the thickness of the first diffusion layer and the thickness of the second diffusion layer are at least 0.5 μm and not more than 2.0 μm.

4. The clad material for a battery negative electrode lead material according to claim 1, wherein
the thickness of the second layer is larger than the thickness of the first layer and the thickness of the third layer.

5. A method of manufacturing a clad material for a battery negative electrode lead material of claim 1, comprising the steps of:
preparing a clad material by rolling a first layer constituted of pure Ni containing at least 99.0 mass % of Ni, a second layer constituted of pure Cu containing at least 99.75 mass % of Cu and a third layer constituted of pure Ni containing at least 99.0 mass % of Ni in a state stacked in this order thereby bonding the first layer, the second layer and the third layer to each other; and
forming a first diffusion layer having a thickness of at least 0.5 μm and not more than 3.5 μm between the first layer and the second layer and a second diffusion layer having a thickness of at least 0.5 μm and not more than 3.5 μm between the second layer and the third layer by holding the clad material under a temperature condition of at least 650° C. and not more than 850° C. for at least 10 seconds and not more than 5 minutes and continuously heat-treating the clad material while transporting the clad material into a continuous furnace.

6. The method of manufacturing a clad material for a battery negative electrode lead material according to claim 5, wherein
heat treatment is so performed in the step of forming the first diffusion layer and the second diffusion layer that the pure Ni of the first layer is diffused into the second layer and the pure Cu of the second layer is diffused into the first layer thereby forming the first diffusion layer containing an Ni—Cu alloy and that the pure Cu of the second layer is diffused into the third layer and the pure Ni of the third layer is diffused into the second layer thereby forming the second diffusion layer containing an Ni—Cu alloy.

7. The method of manufacturing a clad material for a battery negative electrode lead material according to claim 5, wherein
the clad material is held under the temperature condition of at least 650° C. and not more than 850° C. for at least 10 seconds and not more than 3 minutes and continuously heat-treated in the step of forming the first diffusion layer and the second diffusion layer.

8. The method of manufacturing a clad material for a battery negative electrode lead material according to claim 7, wherein
the clad material is held under a temperature condition of at least 700° C. and not more than 850° C. for at least 10 seconds and not more than 3 minutes and continuously heat-treated in the step of forming the first diffusion layer and the second diffusion layer.

9. The method of manufacturing a clad material for a battery negative electrode lead material according to claim 8, wherein
the clad material is held under a temperature condition of at least 800° C. and not more than 850° C. for at least 10 seconds and less than 1 minute and continuously heat-treated in the step of forming the first diffusion layer and the second diffusion layer.

10. The method of manufacturing a clad material for a battery negative electrode lead material according to claim 5, wherein
the clad material is so continuously heat-treated in the step of forming the first diffusion layer and the second diffusion layer that a dispersion in the thickness of the first diffusion layer and a dispersion in the thickness of the second diffusion layer are not more than 1.3 μm.

11. The method of manufacturing a clad material for a battery negative electrode lead material according to claim 10, wherein
the clad material is so continuously heat-treated in the step of forming the first diffusion layer and the second diffusion layer that a dispersion in the thickness of the first diffusion layer and a dispersion in the thickness of the second diffusion layer are not more than 1.0 μm.

12. The method of manufacturing a clad material for a battery negative electrode lead material according to claim 5, wherein
the clad material is so continuously heat-treated in the step of forming the first diffusion layer and the second diffusion layer that the thickness of the first diffusion layer and the thickness of the second diffusion layer are at least 0.5 μm and not more than 2.0 μm.

13. The method of manufacturing a clad material for a battery negative electrode lead material according to claim 5, wherein
the step of preparing the clad material includes the steps of:
forming a bonded material by bonding the first layer, the second layer and the third layer to each other by rolling,
performing heat treatment on the bonded material, and
preparing the clad material by rolling the bonded material subjected to the heat treatment.

14. The method of manufacturing a clad material for a battery negative electrode lead material according to claim 5, further comprising a step of performing skin pass rolling on the clad material provided with the first diffusion layer and the second diffusion layer.

15. A battery comprising:
a battery negative electrode lead material constituted of a clad material of claim 1; and
a battery negative electrode, constituted of an Ni-plated steel plate or an Ni—Fe alloy, to which the battery negative electrode lead material is resistance-welded in a state where the first layer or the third layer is in contact therewith.

16. The battery according to claim 15, wherein
a dispersion in the thickness of the first diffusion layer and a dispersion in the thickness of the second diffusion layer are not more than 1.0 μm.

17. The battery according to claim 15, wherein
the thickness of the first diffusion layer and the thickness of the second diffusion layer are at least 0.5 μm and not more than 2.0 μm.

* * * * *